July 24, 1951  C. S. BRITTON  2,561,903
DETACHABLE SPOUT HAVING MEANS TO FORM DISPENSING
OPENINGS IN CONTAINERS
Filed April 16, 1946

CHARLES S. BRITTON,
INVENTOR.

BY Julian J. Wittel,
HIS ATTORNEY.

Patented July 24, 1951

2,561,903

UNITED STATES PATENT OFFICE 2,561,903

DETACHABLE SPOUT HAVING MEANS TO FORM DISPENSING OPENINGS IN CONTAINERS

Charles S. Britton, New York, N. Y.

Application April 16, 1946, Serial No. 662,491

3 Claims. (Cl. 222—90)

As it is well known, an increasing variety and amount of materials of granulated, powdered, and similar character, like cereals, sugar, powdered soap, etc., is packed in containers of paper or similar material and having walls which are comparatively easily pierced or cut by an appropriate sharp device. As also every housewife, and other persons having to do with such materials, knows, it is quite difficult, slow and awkward to remove or dispense a portion of the contents of such containers, and to close the containers; and such dispensing also causes waste and other annoyance.

The main object of this invention is to provide a device which will be adapted to pierce the wall of such a container and remain thereon, normally in a closed position, but having means whereby it may be opened when it is desired to dispense or remove a portion of the contents of such a container, the device being also adapted to be easily and safely closed after the desired portion of the contents has been removed.

Another object of this invention is to provide a device as characterized hereinbefore which will be easily removable from the container to which it has been applied, so that when the container is fully emptied, the device may be removed and applied to a new container.

Still other objects of this invention will be apparent as the specification of the same proceeds, and, among others, I may mention: to provide a device of the type indicated which will be simple in construction, inexpensive to manufacture, which it will be easy and quick to apply to a container, and use thereon, and which will be similarly easily and quickly removable therefrom, but which nevertheless will be reliable and safe, staying on the container, keeping it normally closed and remaining either in its closed or open position, as it is set, when using the same.

In the drawings forming a part of the specification and accompanying the same:

Figure 1:
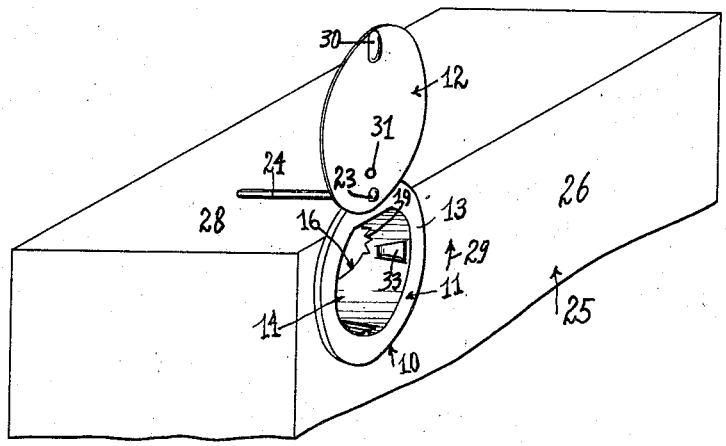
Fig. 1 is a fragmentary perspective view of a corner of a container of granulated or similar product, showing my invention applied to it, and being in an open position.

Referring now to the drawings more in detail by characters of reference, the numeral 10 indicates my novel dispensing and closure device for receptacles, in general, being formed of two main parts, to wit, a preferably circular tube cutting element 11, and a pivoted closure 12 for the same.

In the embodiment shown, the tubular portion 11 is in the form of a circular cylindrical body having a transverse flange 13 around its outer opening 14, a short rearwardly bent flange 15 being formed around the circumference of the flange 13.

The inner end of the tubular portion 11, generally indicated by the numeral 16, is inwardly inclined from the top portion 17 thereof to the bottom portion 18 of it, and at the two sides of its upper part, cutting teeth 19 are formed in it, while the lower part 20 may be formed into one continuous cutting edge terminating substantially in a cutting point 21.

While the tube 11 may be entirely cylindrical in the embodiment shown, it is indicated that the top portion 22 thereof is flattened, for reasons to be explained hereinafter.

The cover or closure member 12 is pivoted on the flange 13, as indicated at 23, and preferably a pin or small rod 24 projects rearwardly from said flange, as in the line of the pivot 23.

Figure 2:
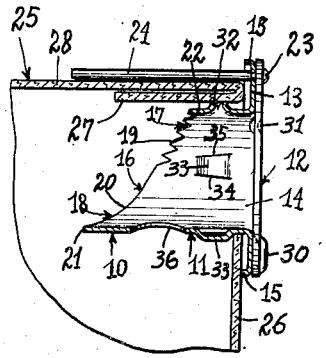
Fig. 2 is a fragmentary sectional view of a container to which my invention has been applied, the same being shown in a closed position.

Referring now to Figs. 1 and 2, the use and operation of my device is as follows: when it is desired to form a dispensing opening in an appropriate wall of a container of some powdered, granulated, or similar material, like cereal, powdered soap, sugar, etc., said receptacle being indicated in a fragmentary manner at 25, my dispensing device 10 will be pushed through an appropriate wall 26 thereof, its end point 21 first piercing said wall, whereupon the long cutting edge 20 and then saw teeth cutters 18 will separate the material of said wall to the extent of these cutting members. The top portion 22 of the device has no cutting edge, and it will simply push the separated portion 27 of the wall 26 inwardly and upwardly, and in case the device is employed adjacent to a transverse wall 28 of the container 25, the separated portion 27 will be folded along said transverse wall 28.

In Figs. 1 and 2, the wall 26 is the front wall of the receptacle and 28 is the top thereof, so that my device will be pushed through said front wall 25, at an appropriately close distance below the top 28 thereof to insure the right distance and position for the application of my device. Also to further secure it in its position against rotation, the said rod or pin 24 is employed, and my device will be applied to the container 25 in such a manner that the pin or rod 24 will ride or slide on the top 28, as indicated in the drawings.

Figure 3:
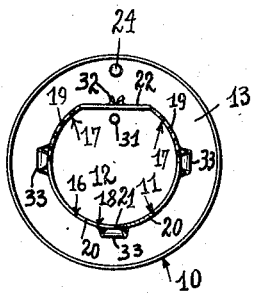
Fig. 3 is a rear view of my dispensing device.

After my device is thus pushed through the wall 26 of the receptacle, the contents thereof may be poured out through the tube 11 and its open end 14. Normally, however, this end is closed by the cover or closure 12 as indicated in Figs. 2 and 3. When it is desired to pour the contents, the closure 12 will be turned on the pivot 23, as indicated by the arrow 29, until it entirely reveals the opening 14, as indicated in Fig. 1.

When the device is not in use, the closure member 12 will be swung down into its closed position. An outwardly bent raised portion 30 will be provided in the closure device 12, opposite the pivot 23, and the closure device may be operated by said outwardly raised portion 30, the same being gripped by the thumb and finger of the user.

An inward indentation 31 may also be provided in said cover or closure 12, whereby the opening or closing thereof can be done only when using a certain moderate exertion and force, as will be understood. When the device is entirely open, as shown in Fig. 1, the indentation 31 will prevent the pivoting of its closure, which can be effected only if the inwardly indented part 31 is forced over the flange 13, for which the device will have sufficient yielding. Similarly, when closed, the device can be opened only by forcing the indentation 31 over the flange 13. My device therefore will remain in a closed or in an open position as set.

On the top part of the tube 11, I also provide an upwardly pointing pierced portion 32, the purpose of which is to engage the rearwardly folded separated receptacle wall portion 27, and to additionally prevent a rotation of the device when in the receptacle, and an outward dropping or removal thereof from the same. For the latter purpose I also make three separated portions 33, preferably at the right hand and left hand sides, and at the bottom, of the tubular part 11, at a desired distance from the flange 13. Portions 33 are separated from the material of the tube by two incisions 34 and 35, which preferably also will be inclined towards one another, and the material therebetween will be bent outwardly to form said raised portions 33. The raised portions will prevent an outward loosening and moving of the device from the receptacle by leaning against the front wall 26 thereof.

Finally a comparatively large hole 36 may be provided in the bottom part of the tube 11. The purpose of this opening is that when most of the contents of the receptacle 25 have been poured out of the same, it would be slow and difficult to pour the finally remaining part through the rear opening 16 or the tube 11, and in such cases it will be easier to pour the same through said hole 36.

Figure 4:
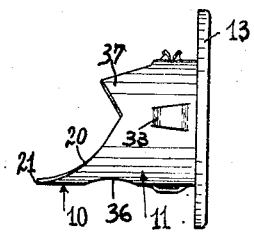
Fig. 4 is a side view of a modification of my invention.

In Fig. 4 I show a slightly modified form of my invention wherein the inner cutting edge is formed with one single large cutting tooth 37 instead of the several teeth 18.

It will also be obvious that instead of the cylindrical form, any other forms may be used for the tube 11, as, for instance, it may be made rectangular.

While I have shown and described a preferred embodiment of my invention, it is obvious that changes and variations may be resorted to in the details of its elements and combinations, and I want it to be understood that I reserve my rights to all such changes and variations which are within the spirit of this specification and the scope of the claims hereunto appended.

One such modification may consist in changing the construction of the form shown in Fig. 4 whereby the top edge of the pronounced, projecting, large tooth 37 would be made in parallelism with the top of the tubular member 11. This arrangement will facilitate the judging of the position of my device when applied to a new container. The user may judge the necessary distance from the next wall of the container by the top edge of the tooth 37.

What I claim as new and want to protect by Letters Patent of the United States is:

1. In a removable dispensing device for containers, having a tubular body, one, the inner, end of the same being adapted to pierce the wall of the container and enter into the same, the other, outer, end remaining outside of the container, the combination, of a flange arranged around the outer end of said tubular body whereby the same may be pressed against the wall of the container, a pin secured into said flange parallel with said body but spaced apart therefrom whereby when said body is entered into a container, said pin may engage the outside of an adjacent perpendicular wall thereof and thereby locate the position of the dispensing device with reference to said perpendicular wall, a portion of said tubular body being flat and having a blunt advancing edge whereby the same will not sever the respective portion of the container wall, but will fold it towards said pin, so that said folded portion will be pressed against said adjacent perpendicular wall, prongs struck outwardly from the material of said flat portion, said pin being placed at a predetermined distance from said flat portion whereby said prongs will press said folded portion and said perpendicular wall against said pin, the tip of the prong entering said folded portion for temporarily securing said tubular body against a withdrawal from said container.

2. In a device, as set forth in claim 1, a cover for the outer opening of said tubular body, said pin projecting through said flange and said cover being pivoted on the outer end of said pin.

3. In a removable dispensing device for containers, having a tubular body, one, the inner, end of the same being adapted to pierce the wall of the container and enter into the same, the other, outer, end remaining outside of the container, the combination, of a flange arranged around the outer end of said tubular body whereby the same may be pressed against the wall of the container, a pin secured into said flange parallel with said body but spaced apart therefrom whereby when said body is entered into a container, said pin may engage the outside of an adjacent perpendicular wall thereof and thereby locate the position of the dispensing device with reference to said perpendicular wall, a cover for the outer opening of said tubular body, said pin projecting through said flange and said cover being pivoted on the outer end of said pin.

CHARLES S. BRITTON.

REFERENCES CITED

The following references are of record in the file of this patent:

UNITED STATES PATENTS

| Number | Name | Date |
| --- | --- | --- |
| 1,889,557 | Lange | Nov. 29, 1932 |
| 2,267,159 | Lopes | Dec. 23, 1941 |
| 2,312,351 | McCarthy | Mar. 2, 1943 |
| 2,318,899 | Stilwell | May 11, 1943 |
| 2,421,589 | Wiswell | June 3, 1947 |